US008123299B2

(12) United States Patent
Lin

(10) Patent No.: US 8,123,299 B2
(45) Date of Patent: Feb. 28, 2012

(54) ARMREST AND METHODS FOR MANUFACTURING SAME

(76) Inventor: Shih-Te Lin, Tainan (TW)

( * ) Notice: Subject to any disclaimer, the term of this patent is extended or adjusted under 35 U.S.C. 154(b) by 374 days.

(21) Appl. No.: 12/573,135

(22) Filed: Oct. 4, 2009

(65) Prior Publication Data

US 2011/0080030 A1 Apr. 7, 2011

(51) Int. Cl.
*B60N 2/42* (2006.01)

(52) U.S. Cl. .................. 297/411.2; 297/463.2; 144/351; 144/350; 144/347; 144/355; 156/304.1

(58) Field of Classification Search ............... 297/411.2, 297/463.2; 144/351, 347, 350, 355; 156/304.1; 428/535, 537.1

See application file for complete search history.

(56) References Cited

U.S. PATENT DOCUMENTS 1,594,889 A * 8/1926 Loetscher ..................... 144/351
1,638,262 A * 8/1927 Herzog ......................... 144/351
4,946,224 A * 8/1990 Leib ........................... 297/451.1
5,050,653 A * 9/1991 Brown .......................... 144/351
5,288,131 A * 2/1994 Singley .................... 297/452.24
5,332,461 A * 7/1994 Huesler ......................... 156/264
5,725,929 A * 3/1998 Cooke et al. .................. 428/106
5,985,398 A * 11/1999 Bellegarde ....................... 428/54
6,276,413 B1 * 8/2001 Hill .............................. 144/350
6,367,878 B1 * 4/2002 Chung ....................... 297/411.2
6,519,912 B1 * 2/2003 Eckmann et al. ............... 52/847
6,582,021 B1 * 6/2003 Chung ....................... 297/411.2
6,701,984 B2 * 3/2004 Lamontagne et al. ........ 144/347
7,128,960 B2 * 10/2006 Walz et al. .................... 428/114
7,438,360 B2 * 10/2008 Chung ....................... 297/411.2
7,665,263 B2 * 2/2010 Yau ................................ 52/578
2004/0086334 A1 * 5/2004 Kamarata ......................... 404/6
2008/0073964 A1 * 3/2008 Chung ....................... 297/411.2
2009/0291286 A1 * 11/2009 Shen ............................ 428/220
2010/0295334 A1 * 11/2010 Chorney et al. ............ 296/184.1
2011/0049959 A1 * 3/2011 Schwartz .................. 297/411.2
2011/0179740 A1 * 7/2011 Padmanabhan .............. 52/588.1
2011/0195809 A1 * 8/2011 Mcdonald ..................... 473/564

* cited by examiner

*Primary Examiner* — Laurie Cranmer

(57) ABSTRACT

A method for manufacturing an armrest includes making a plurality of core sections. Each core section is formed by bonding a plurality of waste pieces of high-quality wood together. Each of two adjacent ends respectively of two adjacent core sections is machined to provide a serrated coupling face having a plurality of grooves and a plurality of protrusions. The core sections are bonded together to form a core having a desired length by applying adhesive to the serrated coupling faces. A plurality of upper boards made of the same material as the core is bonded to a top side of the core. A plurality of lateral boards made of the same material as the core is bonded to each of two lateral sides of the core.

7 Claims, 10 Drawing Sheets

ARMREST AND METHODS FOR MANUFACTURING SAME

BACKGROUND OF THE INVENTION

1. Field of the Invention

The present invention relates to an armrest, and more particularly, to a wooden armrest made with less material and having enhanced structural strength and prolonged service life. The present invention also relates to methods for manufacturing the armrest.

2. Description of the Related Art

Conventional armrests are generally made of wood materials. However, armrests entirely made of a single piece of timber are a waste in view of limited wood resources. To save precious wood materials while providing the same appearance, it has been proposed to provide an upper veneer layer made of oak for covering an upper surface of an armrest body made of a wood material (such as rubber wood or pinewood from plantation forests) different from oak and to provide two lateral veneer layers made of oak for covering two lateral surfaces of the armrest body. An example of such an armrest is disclosed in U.S. Pat. No. 6,582,021. However, the armrest body and the upper and lateral veneer layers generally fixed to the armrest body by gluing the have different characteristics in fiber density, specific weight, elongation and shrinkage resulting from temperature change. The armrest is liable to break at the gluing section between the armrest body and the veneer layers due to different deformation resulting from temperature change. Furthermore, although the armrest body is not made of oak, use of the upper and lateral veneer layers made oak could still be a waste if the products do not require a quality appearance.

Thus, a need exists for a wooden armrest made with less material and having enhanced structural strength and prolonged service life.

BRIEF SUMMARY OF THE INVENTION

The present invention solves this need and other problems in the field of manufacture of high-quality armrests with low costs by providing, in a first aspect, a method for manufacturing an armrest includes making a plurality of core sections. Each of the plurality of core sections is formed by bonding a plurality of waste pieces of high-quality wood together. Outer faces of the plurality of core sections are processed to be smooth and planar. Each of the plurality of the core sections has two lateral faces and top and bottom faces. Each of two adjacent ends respectively of two adjacent core sections is machined to provide a serrated coupling face having a plurality of horizontal grooves and a plurality of horizontal protrusions. The plurality of core sections are bonded together to form a core by applying adhesive to the serrated coupling faces to bond the two adjacent ends respectively of the two adjacent core sections. A surface portion made of a material the same as the plurality of core sections is prepared and bonded to the core. The surface portion includes a plurality of upper boards and a plurality of lateral boards. Each of two adjacent ends respectively of two adjacent upper boards has a first, planar, engaging face. Each of two adjacent ends respectively of two adjacent lateral boards has a second, planar engaging face. Each of the plurality of lateral boards has a height the same as that of the lateral face of each of the plurality of core sections. Each of the plurality of upper boards has a width the same as a sum of a width of the top face of each of the plurality of core sections and two times of a width of a top face of each of the plurality of lateral boards.

Inner faces of the plurality of lateral boards are bonded to the lateral faces of the plurality of core sections. Inner faces of the plurality of upper boards are bonded to the top faces of the plurality of core sections and the top faces of the plurality of lateral boards. The first engaging faces of two adjacent upper boards are bonded together, leaving an unobvious rectilinear coupling edge. The second engaging faces of two adjacent lateral boards bonded together, leaving an unobvious rectilinear coupling edge. Serrated coupling edges of the serrated coupling faces of the plurality of core sections are covered by the plurality of lateral boards. The armrest is processed to include a first outline on outer faces of the plurality of upper boards and a second outline on outer faces of the lateral boards, with the top faces of the plurality of core sections still covered by the plurality of upper boards, and with the lateral faces of the plurality of core sections still covered by the plurality of lateral boards.

According to a second aspect, a method for manufacturing an armrest includes making a plurality of core sections. Each of the plurality of core sections is formed by bonding a plurality of waste pieces of high-quality wood together. Outer faces of the plurality of core sections are processed to be smooth and planar. Each of the plurality of the core sections has two lateral faces and top and bottom faces. Each of two adjacent ends respectively of two adjacent core sections is machined to provide a first serrated coupling face having a plurality of horizontal grooves and a plurality of horizontal protrusions. The plurality of core sections are bonded together to form a plurality of longer core sections by applying adhesive to the first serrated coupling faces to bond the two adjacent ends respectively of the two adjacent core sections. Serrated coupling edges of the first serrated coupling faces are located in two lateral sides of the plurality of longer core sections. A surface portion made of a material the same as the plurality of core sections is prepared. The surface portion includes a plurality of upper boards and a plurality of lateral boards. Each of two adjacent lateral boards has a planar engaging face. Each of the plurality of lateral boards has a height the same as that of the lateral face of each of the plurality of longer core sections. A length of each of the plurality of lateral boards is equal to a length of each of the plurality of longer core sections. Inner faces of the plurality of lateral boards are bonded to the two lateral faces of the plurality of longer core sections. The engaging faces of two adjacent lateral boards are bonded together, leaving an unobvious rectilinear coupling edge. The serrated coupling edges of the first serrated coupling faces of the longer core sections are covered by the plurality of lateral boards. Each of two adjacent upper boards has a planar, engaging face. Each of the plurality of upper boards has a width the same as a sum of a width of the top face of each of the plurality of longer core sections and two times of a width of a top face of each of the plurality of lateral boards. Each of two adjacent ends respectively of two adjacent longer core sections is machined to provide a second serrated coupling face having a plurality of horizontal grooves and a plurality of horizontal protrusions. The plurality of longer core sections are bonded together to form a core by applying adhesive to the second serrated coupling faces to bond the two adjacent ends respectively of the two adjacent longer core sections. Serrated coupling edges of the second serrated coupling faces are located in the two lateral faces of the plurality of longer core sections. The plurality of upper boards are bonded to the core with inner faces of the plurality of upper boards bonded to the top faces of the plurality of core sections and the top faces of the plurality of lateral boards. The engaging faces of two adjacent upper boards are bonded together, leaving an unobvious rectilinear coupling edge. The serrated coupling edges of the second serrated coupling faces are covered by the plurality of upper boards. The armrest is processed to include a first outline on outer faces of the plurality of upper boards and a second outline on outer faces of the plurality of lateral boards, with the top faces of the plurality of core sections still covered by the plurality of upper boards, and with the lateral faces of the plurality of core sections still covered by the plurality of lateral boards.

According a third aspect, an armrest includes a core comprised of a plurality of core sections formed by bonding a plurality of waste pieces of high-quality wood. Each of two adjacent ends respectively of two adjacent core sections includes a serrated coupling face having a plurality of horizontal grooves and a plurality of horizontal protrusions. Each of the plurality of core sections includes two lateral faces and top and bottom faces. Adhesive is applied to the serrated coupling faces to bond the plurality of core sections together, leaving serrated coupling edges of the serrated coupling faces in the lateral faces of the plurality of core sections. The armrest further includes a surface portion made of a wood material the same as the plurality of core sections and including an upper side comprised of a plurality of upper boards and two lateral sides each of which is comprised of a plurality of lateral boards. Each of the plurality of lateral boards and the plurality of the upper boards is a parallelepiped. Each of two adjacent ends respectively of two adjacent upper boards has a first, planar, engaging face. Each of two adjacent ends respectively of two adjacent lateral boards has a second, planar, engaging face. Each of the plurality of lateral boards has a height the same as that of the lateral face of each of the plurality of core sections. Each of the plurality of upper boards has a width the same as a sum of a width of the top face of each of the plurality of core sections and two times of a width of a top face of each of the plurality of lateral boards. Inner faces of the plurality of upper boards are bonded to the top faces of the plurality of core sections and the top faces of the plurality of lateral boards. The first engaging faces of two adjacent upper boards are bonded together, leaving a rectilinear coupling edge. The second engaging faces of two adjacent lateral boards are bonded together, leaving a rectilinear coupling edge. The serrated coupling edges of the core sections of the plurality of core sections are covered by the plurality of lateral boards.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1:
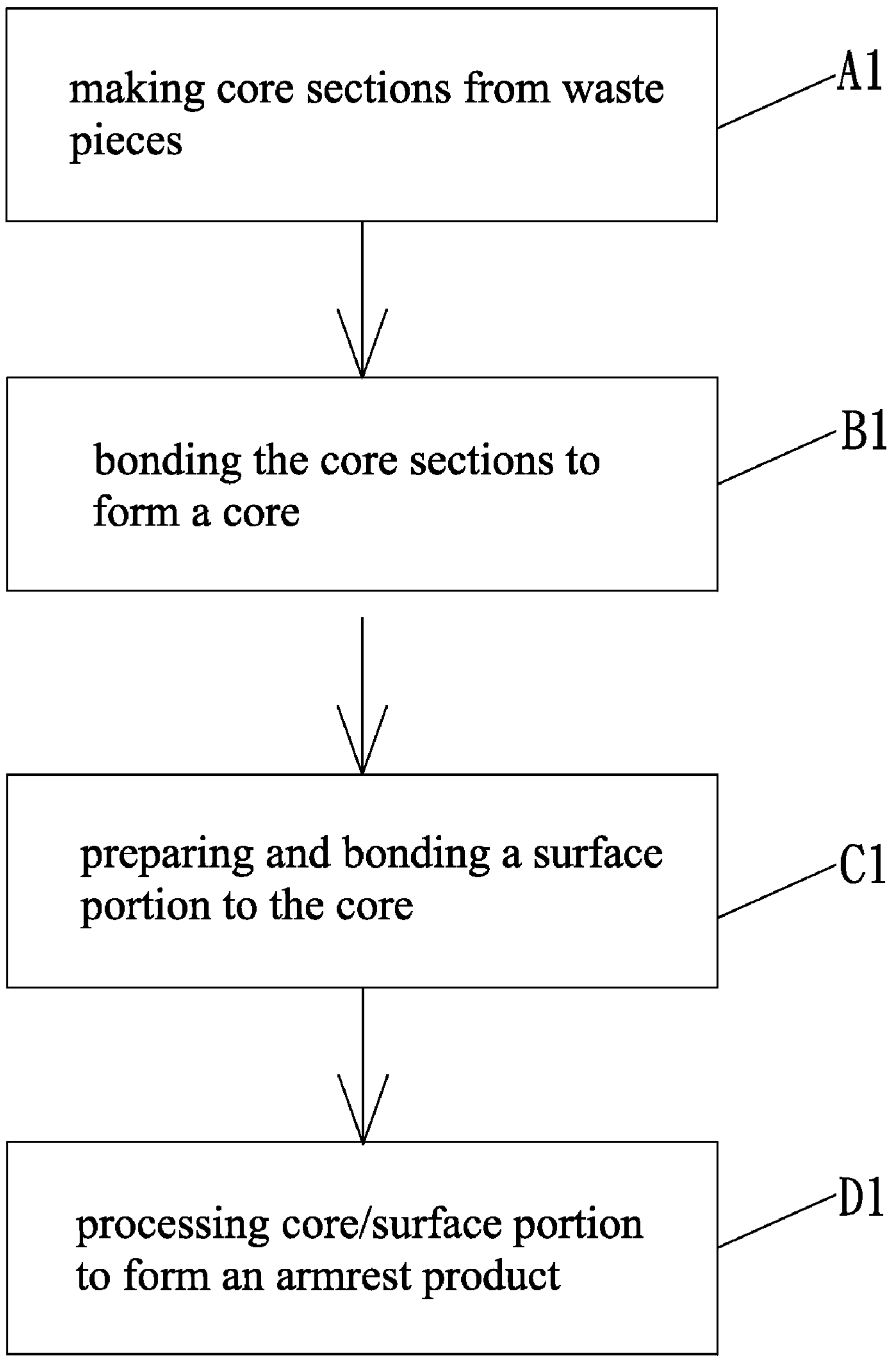
FIG. 1 shows a flowchart of a method for manufacturing an armrest of a first example according to the preferred teachings of the present invention.
Figure 2:
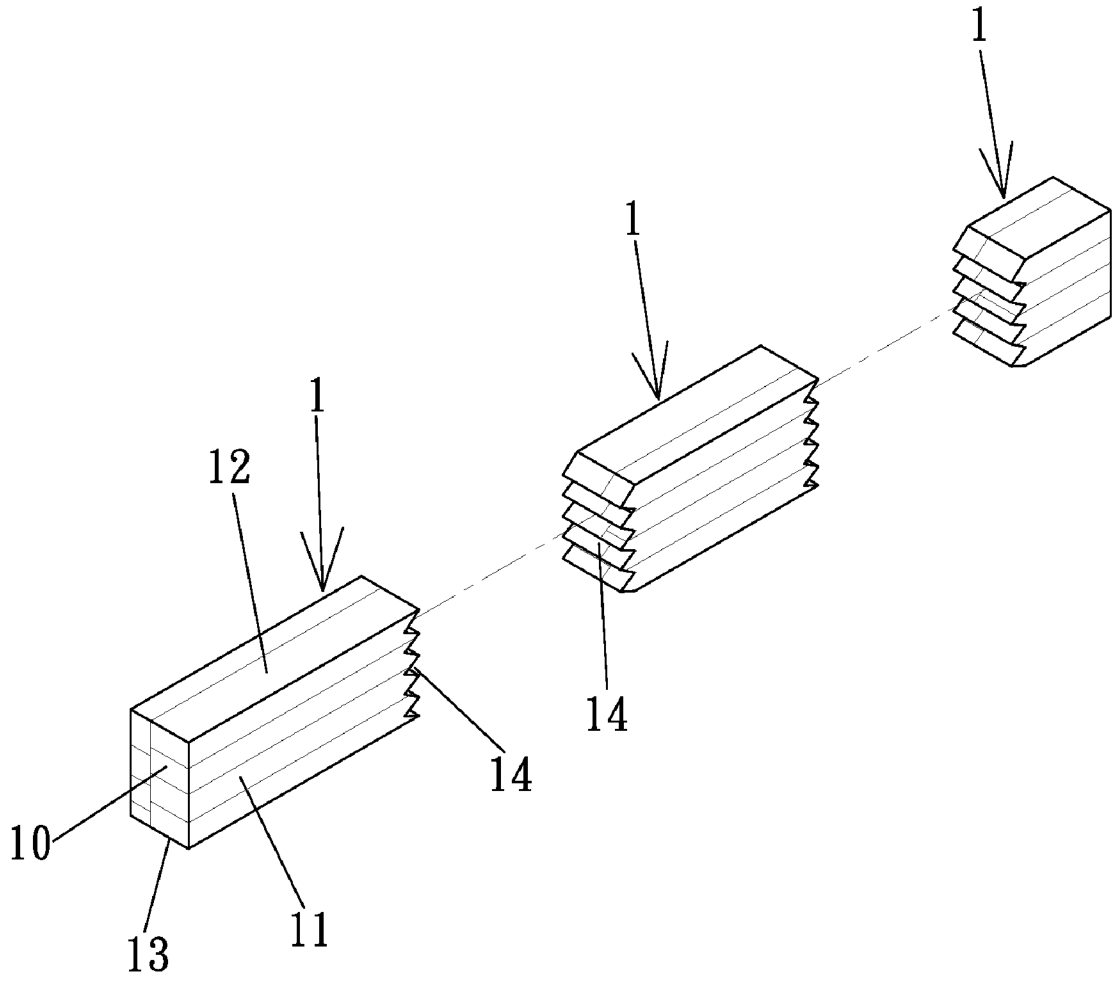
FIG. 2 shows an exploded, perspective view of a core of an armrest blank formed by bonding a plurality of core sections according to the method of FIG. 1.
Figure 3:
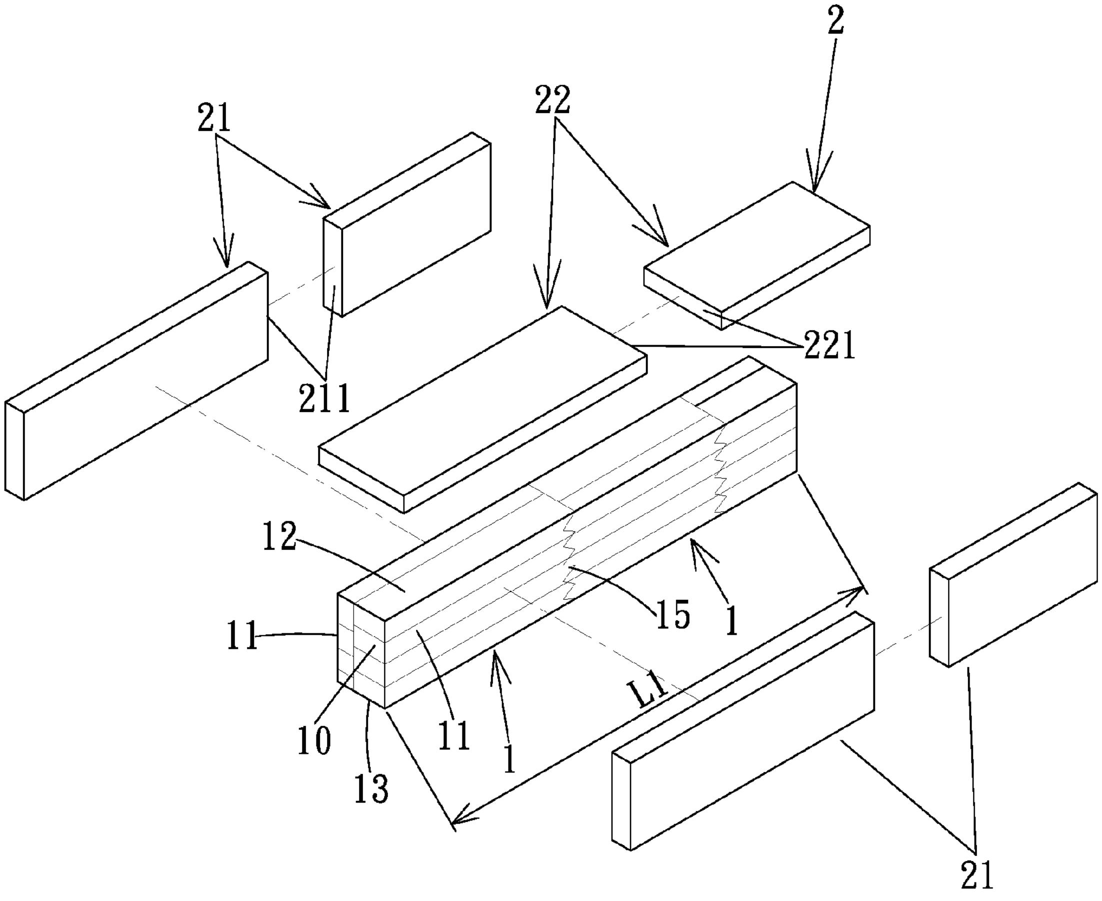
FIG. 3 shows an exploded, perspective view of an armrest blank including the core sections of FIG. 2 and a surface portion.
Figure 4:
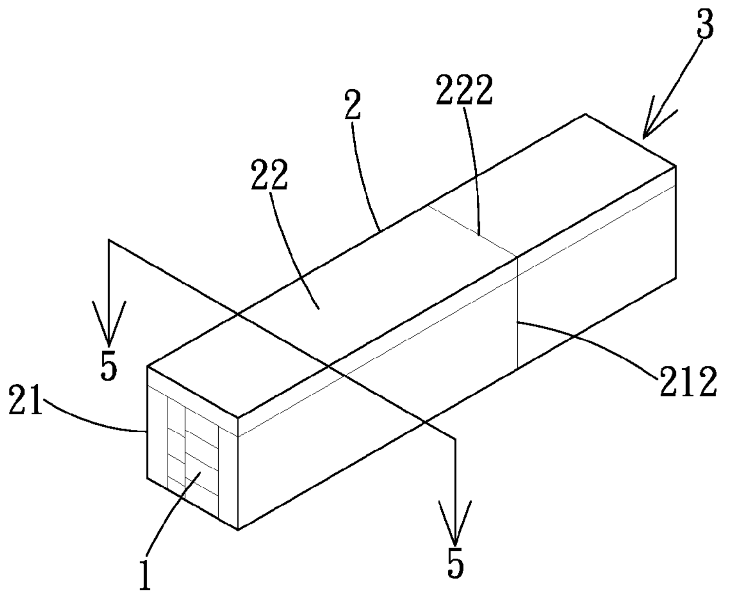
FIG. 4 shows a perspective view of the armrest blank of FIG. 3 after bonding.

FIG. 1 shows a flowchart of a method for manufacturing an armrest of a first example according to the preferred teachings of the present invention. FIG. 2 shows an exploded, perspective view of a core of an armrest blank formed by bonding a plurality of core sections 1 according to the method of FIG. 1. FIG. 3 shows an exploded, perspective view of an armrest blank including the core sections 1 of FIG. 2 and a surface portion 2.

Figure 5:
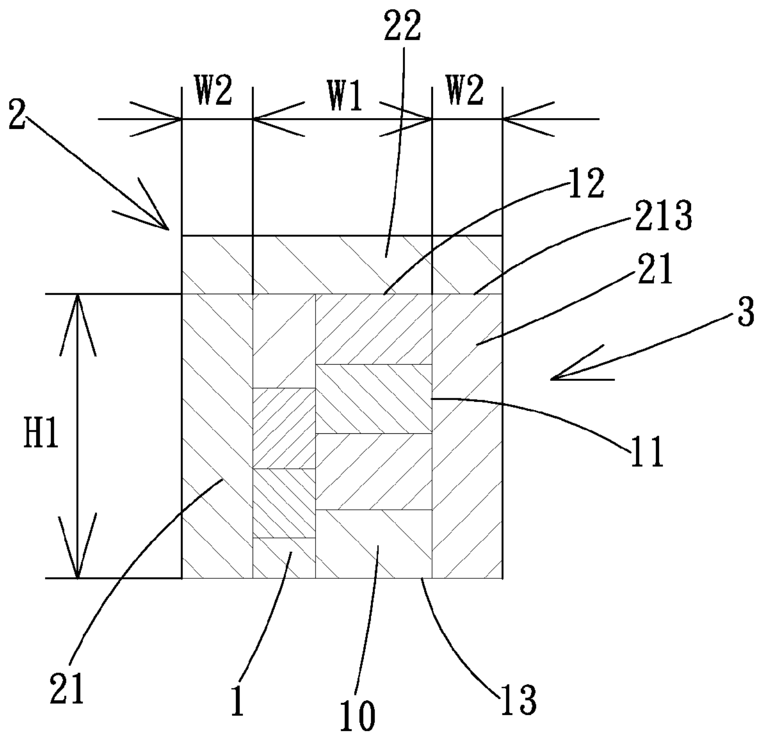
FIG. 5 shows a cross sectional view of the armrest blank of FIG. 4 according to section line 5-5 of FIG. 4.

Specifically, the method for manufacturing an armrest of the first example according to the preferred teachings of the present invention includes making a plurality of core sections 1. Each core section 1 has rectangular cross sections and includes two lateral faces 11 spaced in a width direction, a top face 12 extending between the lateral faces 11, and a bottom face 13 extending between the lateral faces 11 and spaced from the top face 12 in a height direction perpendicular to the width direction. Each core section 1 further includes two ends each extending between the top and bottom faces 12 and 13 and between the lateral faces 11. Each of two adjacent ends respectively of two adjacent core sections 1 is machined to provide a serrated coupling face 14 having a plurality of horizontal grooves and a plurality of horizontal protrusions. Each core section 1 has a height H1 between the top and bottom faces 12 and 13 and a width W1 between the lateral faces 11 (FIG. 5). Each core section 1 is formed by bonding a plurality of waste pieces 10 of high-quality wood together (see A1 of FIG. 1). The waste pieces 10 are wastes of cutting a high quality wood and generally not utilized in conventional methods for manufacturing armrests. The high quality wood can be oak, beech, maple, cheery tree, Brazil cheery tree, mahogany, etc. The core sections 1 do not have to be of equal length in a length direction perpendicular to the width and height directions.

Next, the top and bottom faces 12 and 13 and the lateral faces 11 of each core section 1 are processed to be smooth and planar. The core sections 1 are bonded together to form a core of a length L1 by applying adhesive to and engaging the serrated coupling faces 14 of the core sections 1 (see B1 of FIG. 1 and FIG. 3). The serrated coupling faces 14 increase the coupling force between the core sections 1 by increasing the coupling area. After bonding, the serrated coupling edges 15 of the serrated coupling faces 14 are located on the lateral faces 11 of the bonded core sections 1.

Next, a surface portion 2 made of a high quality wood the same as the core sections 1 is prepared and bonded with the core sections 1 (see C1 of FIG. 1). The surface portion 2 includes a plurality of upper boards 22 and a plurality of lateral boards 21. Each of the lateral boards 21 and the upper boards 22 are in the form of a parallelepiped. Each upper board 22 and each lateral board 21 are processed to have a specific size in the length, width, and height. Each of two adjacent ends respectively of two adjacent lateral boards 21 has a planar engaging face 211. Each of two adjacent ends respectively of two adjacent upper boards 22 has a planar engaging face 221. Each lateral board 21 has a height H1 equal to that of each core section 1. Each upper board 22 has a width equal to a sum of the width W1 of the top face 12 of each core section 1 and two times of the width W2 of a top face 213 of each lateral board 21. Inner faces of the lateral boards 21 abut and are bonded by adhesive to the lateral faces 11 of the core sections 1. The planar engaging faces 211 of two adjacent lateral boards 21 are also bonded together. After bonding, the coupling edges 212 of the lateral boards 21 are not obvious, and the lateral boards 21 cover the serrated coupling edges 15 of the core sections 1, providing an aesthetic appearance. Likewise, the upper boards 22 abut and are bonded by adhesive to the top faces 12 of the core sections and the top faces 213 of the lateral boards 21. After bonding, the coupling edges 222 of the upper boards 22 are not obvious, providing an aesthetic appearance. The planar engaging faces 221 of two adjacent upper boards 22 are also bonded together (see FIG. 5).

Figure 6:
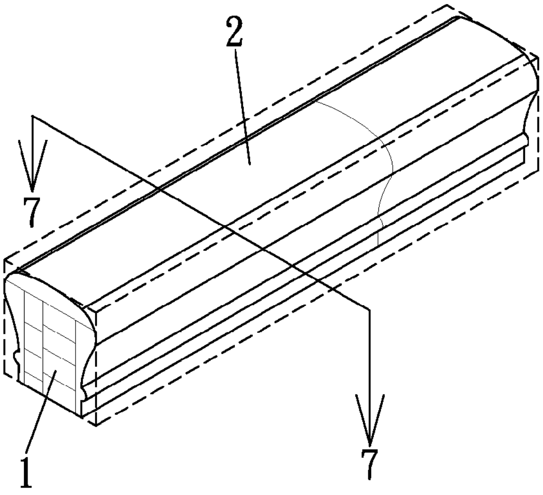
FIG. 6 shows a perspective view of a final product of an armrest after processing the armrest blank of FIG. 4.
Figure 7:
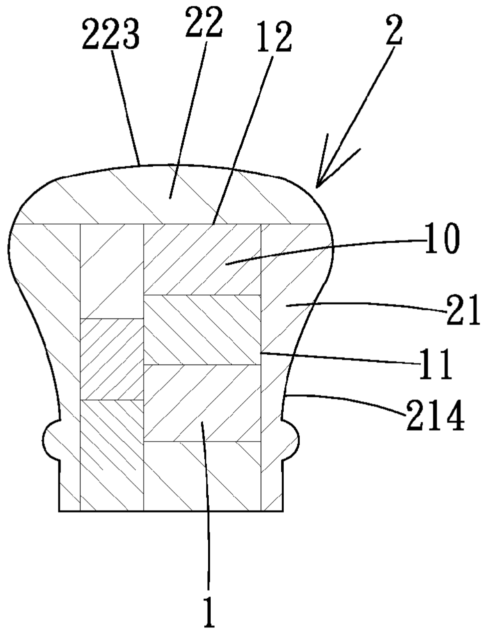
FIG. 7 shows a cross sectional view of the armrest of FIG. 6 according to section line 7-7 of FIG. 6.

Then, the armrest blank is processed to provide a final product of an armrest having a desired shape (see D1 of FIG. 1). The lateral faces 11 and the top faces 12 of the core sections 1 are still covered by the lateral boards 21 and the top boards 22 after processing, providing an outline 214 on outer faces of the upper boards 22 and an outline 223 on outer faces of the lateral boards 21 (see FIGS. 6 and 7). Thus, the armrest can have a desired appearance after processing.

Although the bottom side of the armrest made by the method of the first example according to the teachings of the present invention is not covered, it is not seen in normal situations. Thus, the armrest made by the method of the first example according to the teachings of the present invention can be made with lower costs while meeting the practical needs. Furthermore, the core sections 1, the upper boards 22, and the lateral boards 21 are made of the same material and, thus have the same density and bonding strength as well as the same characteristics in expansion and shrinkage. Disengagement between the core sections 1, the upper boards 22, and the lateral boards 21 due to heat expansion and cold shrinkage is, thus, less likely to occur, providing enhanced structural strength and prolonging the service life of the armrest. Further, the whole armrest including the core sections 1 and the upper and lateral boards 22 and 21 is made of waste wood pieces, avoiding waste of high quality wood and saving the precious forests.

Figure 8:
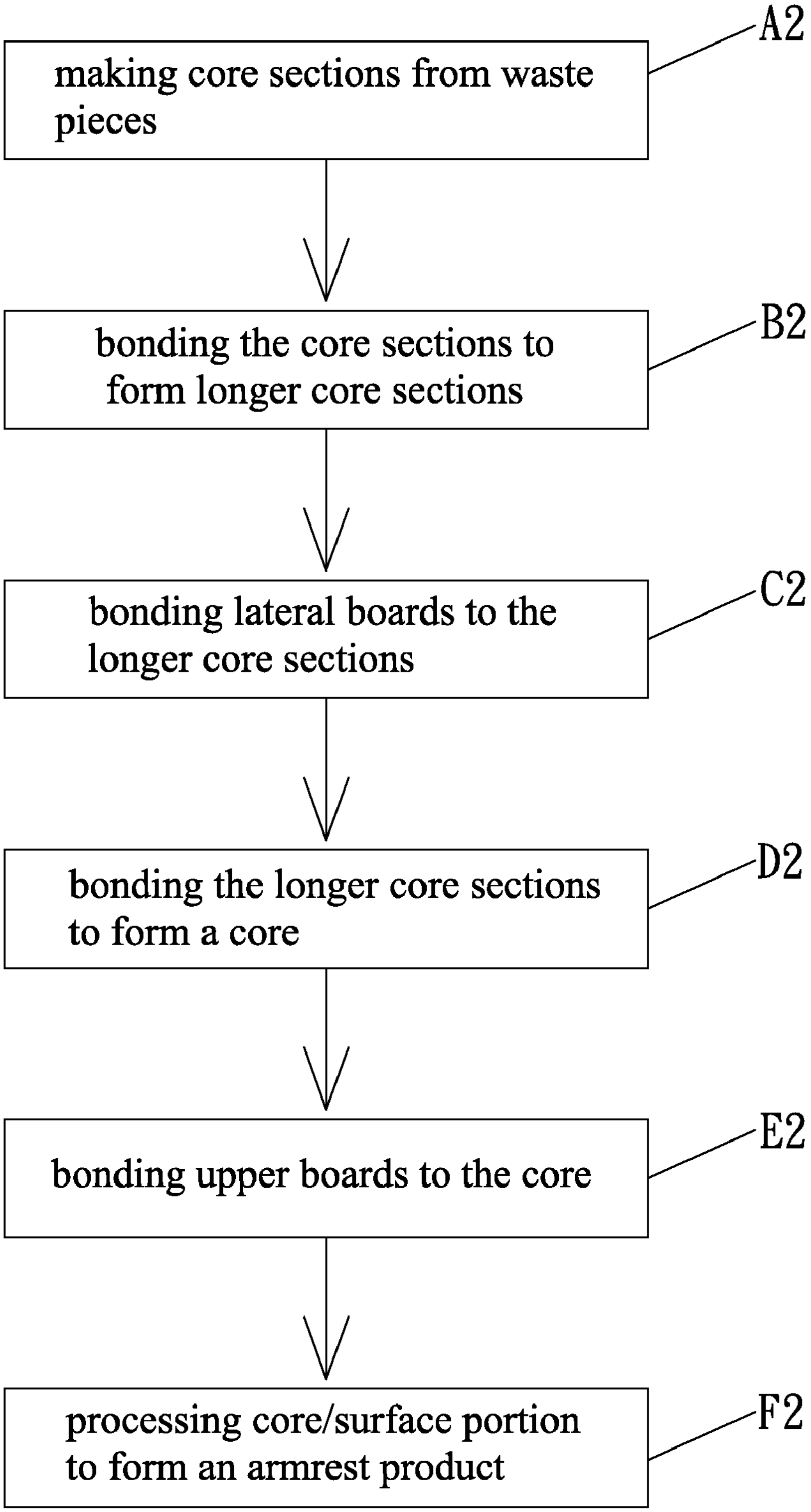
FIG. 8 shows a flowchart of a method for manufacturing an armrest of a second example according to the preferred teachings of the present invention.
Figure 9:
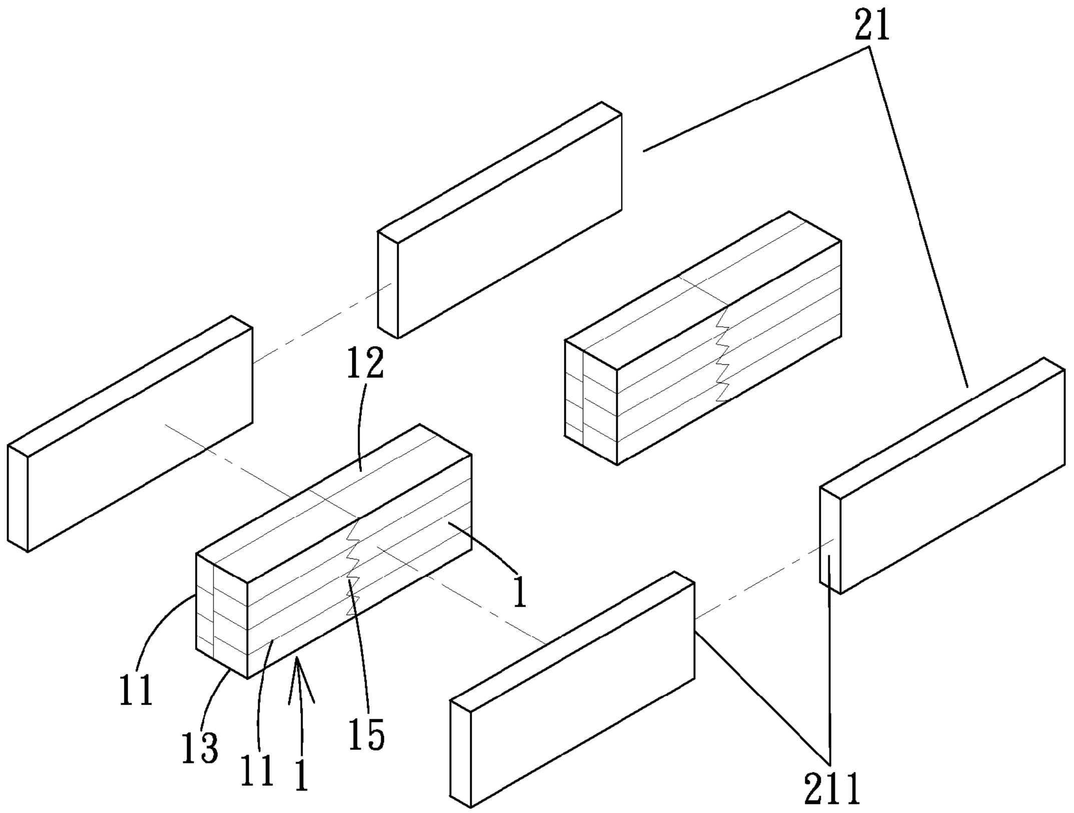
FIG. 9 shows an exploded, perspective view of two armrest portions of an armrest including a core comprised of a plurality of core sections and a plurality of lateral boards.

FIG. 8 shows a flowchart of a method for manufacturing an armrest of a second example according to the preferred teachings of the present invention. The method of the second example can be utilized to manufacture a longer armrest. Specifically, at A2, a plurality of core sections 1 (FIG. 9) is made in a manner the same as A1 of the method of the first example. At B2, the faces of each core section 1 are processed to be smooth, and the core sections 1 are bonded together to form a plurality of longer core sections, which is substantially the same as B1 of the method of the first example. Each longer core section includes two lateral faces 11 and top and bottom faces 12 and 13. After bonding, the serrated coupling edges 15 of the serrated coupling faces 14 are located on the lateral faces 11 of the core sections 1. It can be appreciated that the core sections 1 can be bonded as many as required for the length of the longer core section.

At C2, a surface portion 2 made of a high quality wood the same as the core sections 1 is prepared and bonded with the longer core sections. The surface portion 2 includes a plurality of upper boards 22 and a plurality of lateral boards 21. Each lateral board 21 has a height equal to the height of the lateral face 11 of each longer core section. The length of each lateral board 21 is equal to the length of the longer core section. Each of two adjacent ends respectively of two adjacent lateral boards 21 has a planar engaging face 211. Inner faces of the lateral boards 21 abut and are bonded by adhesive to the lateral faces 11 of longer core section. After bonding, the coupling edges 212 of the lateral boards 21 are not obvious, and the lateral boards 21 cover the serrated coupling edges 15 of the core sections 1, providing an aesthetic appearance. Each upper board 22 is in the form of a parallelepiped and has a width equal to a sum of the width of the top face of each longer core section (which is the same as the width of the top face of the core section 1 in the second example) and two times of the width of a top face of each lateral board 21. Each of two adjacent ends respectively of two adjacent upper boards 22 has a planar engaging face 221. Furthermore, each upper board 22 has a length not equal to that of each lateral board 21.

Figure 10:
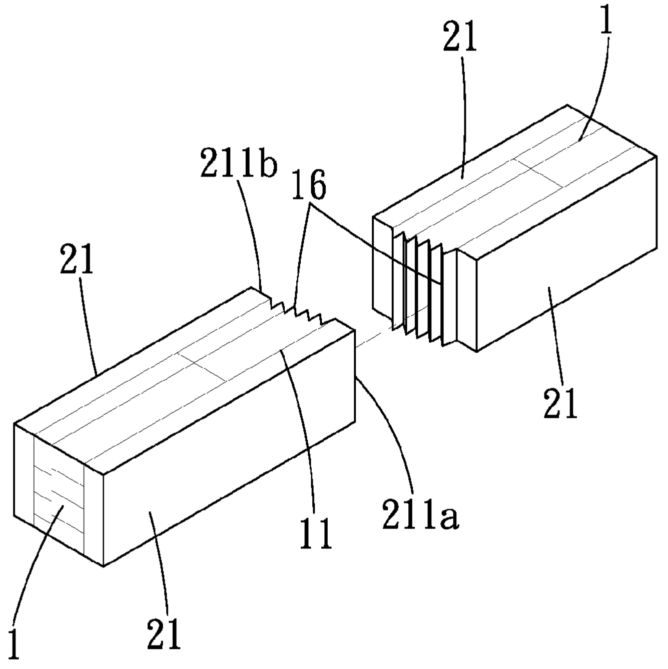
FIG. 10 is an exploded, perspective view illustrating bonding of the armrest portions of FIG. 9 according to the method of FIG. 8.
Figure 11:
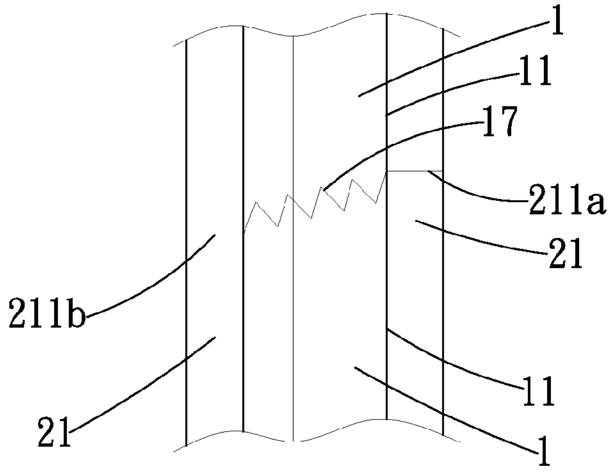
FIG. 11 shows a partial, top view of the armrest portions of FIG. 10 after bonding.

At D2, each of two adjacent ends respectively of two adjacent longer core sections bonded with the lateral boards 21 is machined to provide a serrated coupling face 16 having a plurality of vertical grooves and a plurality of vertical protrusions. The planar engaging faces 211*a* and 211*b* of the lateral boards 21 on opposite side of each longer section are on opposite sides of the serrated coupling face 16 and perpendicular to the lateral boards 21. Furthermore, the engaging face 211*a* of one of the lateral boards 21 has a spacing to the engaging face 211*b* of the other lateral board 21 in the length direction. The longer core sections comprised of the core sections 1 and the lateral boards 2 are bonded together to form a core of a desired length by applying adhesive to the serrated coupling face 16 and the engaging faces 211*a* and 211*b*. The planar engaging faces 211 of two adjacent lateral boards 21 are bonded together. After bonding, the rectilinear coupling edges 212 of the lateral boards 21 are not obvious, providing an aesthetic appearance. Furthermore, since each serrated coupling face 16 extends in a direction different from that of each serrated coupling edge 15 and since the engaging face 211*a* of one of the lateral boards 21 has a spacing to the engaging face 211*b* of the other lateral board 21 in the length direction, the anti-deformation capability of the armrest is increased (see FIGS. 10 and 11).

Figure 12:
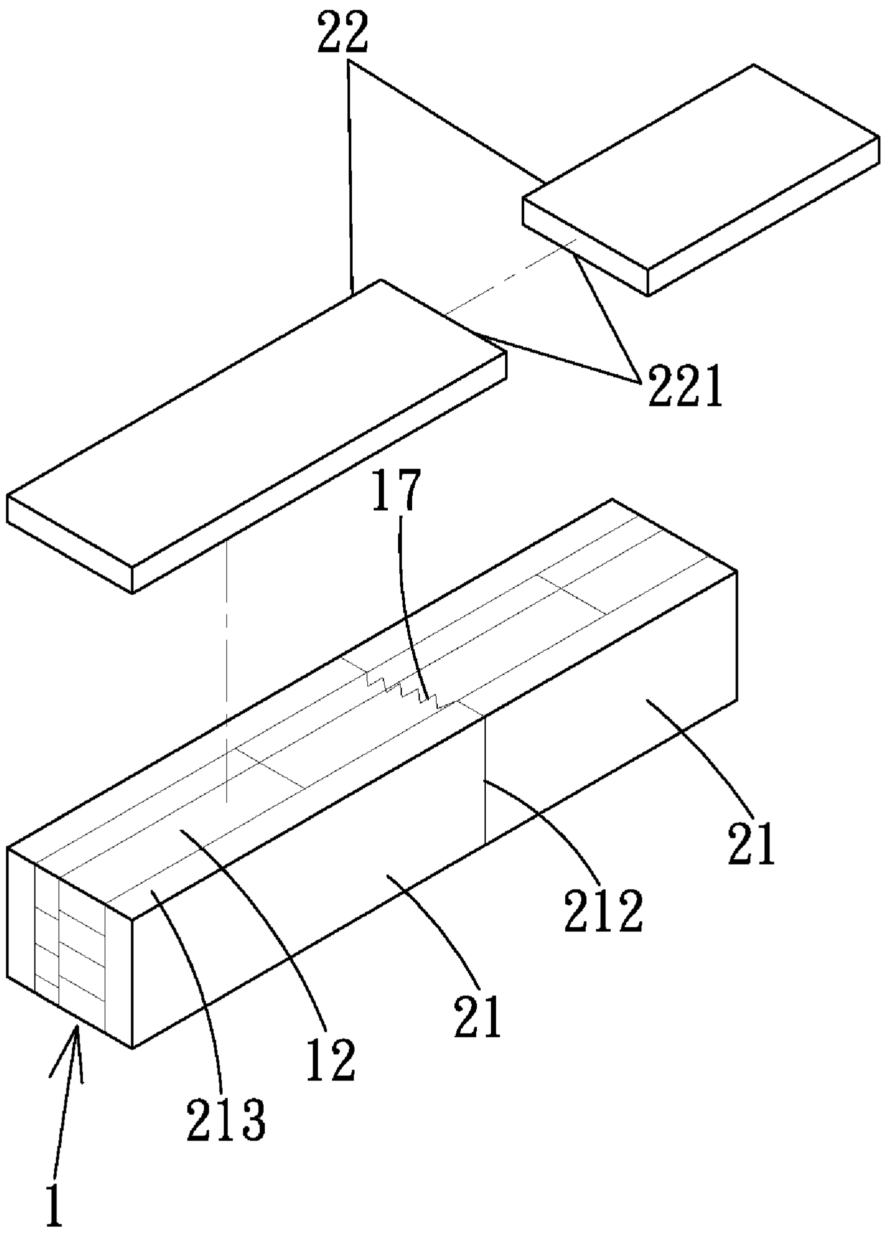
FIG. 12 is an exploded, perspective view illustrating bonding of upper boards according to the method of FIG. 8.
Figure 13:
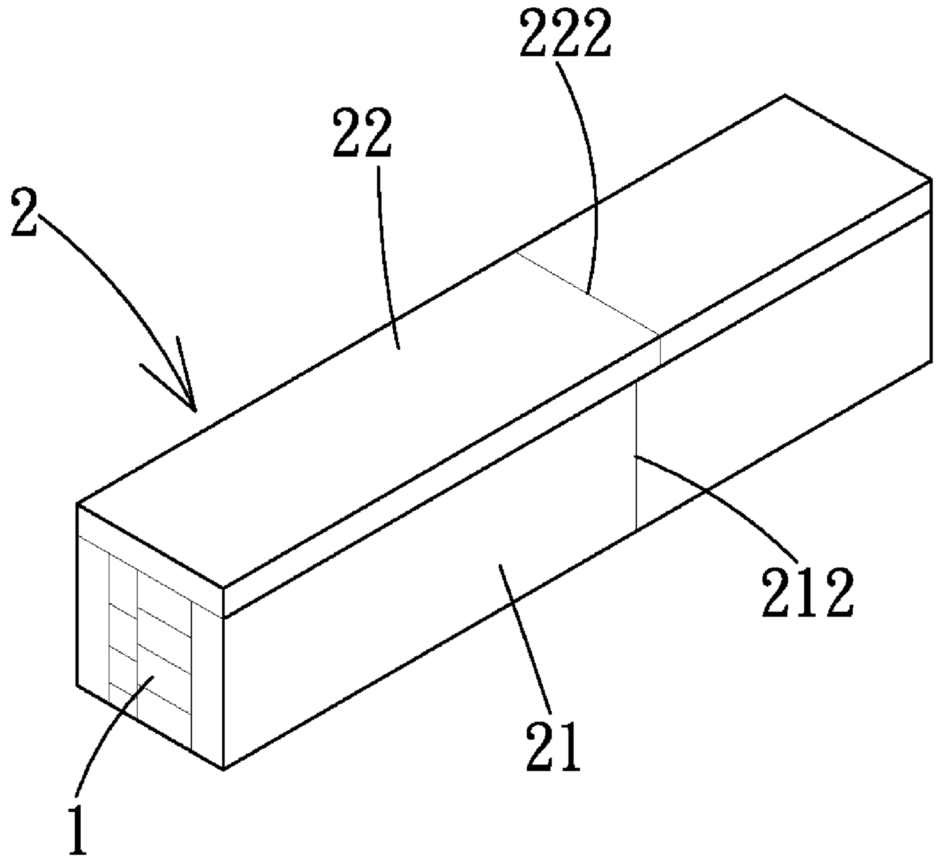
FIG. 13 is a perspective view illustrating the armrest of FIG. 12 after bonding.

At E2, the upper boards 22 are bonded by adhesive to the core. Inner faces of the upper boards 22 are bonded to the top faces 12 of the core sections 1 and the top faces 213 of the lateral boards 21. After bonding, the serrated coupling edges 17 of the longer core sections are covered by the upper boards 22. The planar engaging faces 221 of two adjacent upper boards 22 are also bonded together by adhesive (see FIGS. 12 and 13). After bonding, the rectilinear coupling edges 222 of the upper boards 22 are not obvious, providing an aesthetic appearance. An armrest having core sections 1 whose top face 12 and lateral faces 11 are covered by upper boards 22 and lateral boards 21 is provided. The armrest can have square cross sections. Although the serrated coupling edges can be seen from the bottom side of the armrest, it is usually not seen in normal situations. Thus, the armrest made by the method of the second example according to the teachings of the present invention can be made with lower costs while meeting the practical needs.

Next, at F2, the armrest can be processed to provide a final product of an armrest having a desired shape. The lateral faces 11 and the top faces 12 of the core sections 1 are still covered by the lateral boards 21 and the top bards 22 after processing, providing an outline 214 on outer faces of the upper boards 22 and an outline 223 on outer faces of the lateral boards 21. Thus, the armrest can have a desired appearance after processing.

It can be appreciated that the outer faces of the upper boards 22 and the lateral boards 21 can be processed to include the outlines 214 and 223 before bonded to the core sections 1.

Thus, the armrests manufactured by the methods according to the teachings of the present invention are environmentally friendly and high quality and can be made at low costs. In the preferred forms shown, the armrest manufactured by the methods according to the teachings of the present invention includes a core and a surface portion. The core is comprised of a plurality of core sections 1 formed by bonding a plurality of waste pieces 10 of high-quality wood. Each of two adjacent ends respectively of two adjacent core sections 1 includes a serrated coupling face 14 having horizontal grooves and horizontal protrusions. Adhesive is applied to the serrated coupling faces 14 to bond the core sections 1 together, leaving serrated coupling edges 15 in the lateral faces 11 of the core sections 1. The core sections 1 can have rectangular cross sections. The surface portion is made of a wood material the same as the core sections 1 and includes an upper side comprised of a plurality of upper boards 22 and two lateral sides each of which is comprised of a plurality of lateral boards 21. Each of the lateral boards 21 and the upper boards 22 are in the form of a parallelepiped. Each of two adjacent ends respectively of two adjacent upper boards 22 has a planar engaging face 221. Each of two adjacent ends respectively of two adjacent lateral boards 21 has a planar engaging face 211. Each lateral board 21 has a height the same as that of the lateral face 11 of each core section 1. Each upper board 22 has a width the same as a sum of the width of the top face 12 of each core section 1 and two times of the width of a top face 213 of each lateral board 21. The inner faces of the upper boards 22 are bonded to the top faces 12 of the core sections 1 and the top faces 213 of the lateral boards 21. The engaging faces 221 of two adjacent upper boards 22 are bonded together, leaving unobvious rectilinear coupling edges 222. The engaging faces 211 of two adjacent lateral boards 21 are bonded together, leaving unobvious rectilinear coupling edges 212. The serrated coupling edges 15 of the core sections 1 are covered by the lateral boards 22. Outlines 214 and 223 can be provided on the lateral boards 21 and the upper boards 22. The core sections 1 can include serrated coupling faces 16 having vertical grooves and vertical protrusions when the core sections 1 are to be assembled to a longer core section.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A method for manufacturing an armrest comprising:

making a plurality of core sections, with each of the plurality of core sections being formed by bonding a plurality of waste pieces of high-quality wood together;

processing outer faces of the plurality of core sections to be smooth and planar, with each of the plurality of the core sections having two lateral faces and top and bottom faces, with each of two adjacent ends respectively of two adjacent core sections machined to provide a serrated coupling face having a plurality of horizontal grooves and a plurality of horizontal protrusions, with the plurality of core sections being bonded together to form a core by applying adhesive to the serrated coupling faces to bond the two adjacent ends respectively of the two adjacent core sections;

preparing a surface portion made of a material the same as the plurality of core sections and bonding the surface portion to the core, with the surface portion including a plurality of upper boards and a plurality of lateral boards, with each of two adjacent ends respectively of two adjacent upper boards having a first, planar, engaging face, with each of two adjacent ends respectively of two adjacent lateral boards having a second, planar engaging face, with each of the plurality of lateral boards having a height the same as that of the lateral face of each of the plurality of core sections, with each of the plurality of upper boards having a width the same as a sum of a width of the top face of each of the plurality of core sections and two times of a width of a top face of each of the plurality of lateral boards, with inner faces of the plurality of lateral boards bonded to the lateral faces of the plurality of core sections, with inner faces of the plurality of upper boards bonded to the top faces of the plurality of core sections and the top faces of the plurality of lateral boards, with the first engaging faces of two adjacent upper boards bonded together and leaving an unobvious rectilinear coupling edge, with the second engaging faces of two adjacent lateral boards bonded together and leaving an unobvious rectilinear coupling edge, with serrated coupling edges of the serrated coupling faces of the plurality of core sections covered by the plurality of lateral boards; and processing the armrest to include a first outline on outer faces of the plurality of upper boards and a second outline on outer faces of the lateral boards, with the top faces of the plurality of core sections still covered by the plurality of upper boards, and with the lateral faces of the plurality of core sections still covered by the plurality of lateral boards.

2. The method as claimed in claim 1, with the core and the surface portion being made of oak, beech, maple, cheery tree, Brazil cheery tree, or mahogany.

3. A method for manufacturing an armrest comprising:

making a plurality of core sections, with each of the plurality of core sections being formed by bonding a plurality of waste pieces of high-quality wood together;

processing outer faces of the plurality of core sections to be smooth and planar, with each of the plurality of the core sections having two lateral faces and top and bottom faces, with each of two adjacent ends respectively of two adjacent core sections machined to provide a first serrated coupling face having a plurality of horizontal grooves and a plurality of horizontal protrusions, with the plurality of core sections being bonded together to form a plurality of longer core sections by applying adhesive to the first serrated coupling faces to bond the two adjacent ends respectively of the two adjacent core sections, with serrated coupling edges of the first serrated coupling faces located in two lateral sides of the plurality of longer core sections;

preparing a surface portion made of a material the same as the plurality of core sections, with the surface portion including a plurality of upper boards and a plurality of lateral boards, with each of two adjacent lateral boards having a planar engaging face, with each of the plurality of lateral boards having a height the same as that of the lateral face of each of the plurality of longer core sections, with a length of each of the plurality of lateral boards equal to a length of each of the plurality of longer core sections, with inner faces of the plurality of lateral boards bonded to the two lateral faces of the plurality of longer core sections, with the engaging faces of two adjacent lateral boards bonded together and leaving an unobvious rectilinear coupling edge, with the serrated coupling edges of the first serrated coupling faces of the longer core sections covered by the plurality of lateral boards, with each of two adjacent upper boards having a planar, engaging face, with each of the plurality of upper boards having a width the same as a sum of a width of the top face of each of the plurality of longer core sections and two times of a width of a top face of each of the plurality of lateral boards;

machining each of two adjacent ends respectively of two adjacent longer core sections to provide a second serrated coupling face having a plurality of horizontal grooves and a plurality of horizontal protrusions, with the plurality of longer core sections being bonded together to form a core by applying adhesive to the second serrated coupling faces to bond the two adjacent ends respectively of the two adjacent longer core sections, with serrated coupling edges of the second serrated coupling faces located in the two lateral faces of the plurality of longer core sections;

bonding the plurality of upper boards to the core with inner faces of the plurality of upper boards bonded to the top faces of the plurality of core sections and the top faces of the plurality of lateral boards, with the engaging faces of two adjacent upper boards bonded together and leaving an unobvious rectilinear coupling edge, with the serrated coupling edges of the second serrated coupling faces covered by the plurality of upper boards; and processing the armrest to include a first outline on outer faces of the plurality of upper boards and a second outline on outer faces of the plurality of lateral boards, with the top faces of the plurality of core sections still covered by the plurality of upper boards, and with the lateral faces of the plurality of core sections still covered by the plurality of lateral boards.

4. The method as claimed in claim 3, with the core and the surface portion being made of oak, beech, maple, cheery tree, Brazil cheery tree, or mahogany.

5. An armrest comprising:

a core comprised of a plurality of core sections formed by bonding a plurality of waste pieces of high-quality wood, with each of two adjacent ends respectively of two adjacent core sections including a serrated coupling face having a plurality of horizontal grooves and a plurality of horizontal protrusions, with each of the plurality of core sections including two lateral faces and top and bottom faces, with adhesive applied to the serrated coupling faces to bond the plurality of core sections together, leaving serrated coupling edges of the serrated coupling faces in the lateral faces of the plurality of core sections; and a surface portion made of a wood material the same as the plurality of core sections and including an upper side comprised of a plurality of upper boards and two lateral sides each of which is comprised of a plurality of lateral boards, with each of the plurality of lateral boards and the plurality of the upper boards being a parallelepiped, with each of two adjacent ends respectively of two adjacent upper boards having a first, planar, engaging face, with each of two adjacent ends respectively of two adjacent lateral boards having a second, planar, engaging face, with each of the plurality of lateral boards having a height the same as that of the lateral face of each of the plurality of core sections, with each of the plurality of upper boards having a width the same as a sum of a width of the top face of each of the plurality of core sections and two times of a width of a top face of each of the plurality of lateral boards, with inner faces of the plurality of upper boards bonded to the top faces of the plurality of core sections and the top faces of the plurality of lateral boards, with the first engaging faces of two adjacent upper boards bonded together and leaving a rectilinear coupling edge, with the second engaging faces of two adjacent lateral boards bonded together and leaving a rectilinear coupling edge, with the serrated coupling edges of the core sections of the plurality of core sections covered by the plurality of lateral boards.

6. The armrest as claimed in claim 5, with the lateral boards including a first outline, and with the lateral boards including a second outline.

7. The armrest as claimed in claim 6, with each of two adjacent ends respectively of two adjacent core sections including a second serrated coupling face having a plurality of vertical grooves and a plurality of vertical protrusions, and with adhesive applied to the second serrated coupling faces to bond the two adjacent core sections together.

* * * * *